United States Patent
Chauvet et al.

(10) Patent No.: US 8,269,611 B2
(45) Date of Patent: Sep. 18, 2012

(54) ELECTRONIC TAG READING/WRITING STATION

(75) Inventors: Francis Chauvet, Moutiers (FR); Michel Emmanuel, Chazelles (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 953 days.

(21) Appl. No.: 11/669,455

(22) Filed: Jan. 31, 2007

(65) Prior Publication Data
US 2007/0194888 A1    Aug. 23, 2007

(30) Foreign Application Priority Data

Feb. 7, 2006    (FR) ...................................... 06 50431

(51) Int. Cl.
H04Q 5/22    (2006.01)
G05B 11/01   (2006.01)
G06K 7/10    (2006.01)

(52) U.S. Cl. ................. 340/10.51; 340/10.5; 340/12.23; 340/10.52; 235/462.46; 235/472.02

(58) Field of Classification Search ............... 340/10.41, 340/5.72, 572.1, 572.8
See application file for complete search history.

(56) References Cited

U.S. PATENT DOCUMENTS

| | | | | |
|---|---|---|---|---|
| 7,336,174 B1 * | 2/2008 | Maloney | ..................... | 340/572.1 |
| 7,522,056 B2 * | 4/2009 | Roque | ....................... | 340/572.7 |
| 2002/0044058 A1 * | 4/2002 | Heinrich et al. | ........... | 340/572.1 |
| 2004/0212493 A1 * | 10/2004 | Stilp | ............................ | 340/531 |
| 2005/0012593 A1 * | 1/2005 | Harrod et al. | ................ | 340/5.72 |
| 2005/0139680 A1 * | 6/2005 | Anttila et al. | ............ | 235/462.46 |
| 2005/0162256 A1 * | 7/2005 | Kinoshita | .................. | 340/10.41 |
| 2006/0174353 A1 * | 8/2006 | Ryal | ............................. | 726/31 |
| 2006/0220856 A1 * | 10/2006 | Shaffer et al. | ............. | 340/572.1 |
| 2006/0279413 A1 * | 12/2006 | Yeager | ....................... | 340/10.51 |
| 2007/0152822 A1 * | 7/2007 | Eren et al. | ................... | 340/572.1 |
| 2007/0229267 A1 * | 10/2007 | Traub et al. | ................ | 340/572.1 |
| 2008/0284604 A1 * | 11/2008 | Rubinstein | ................ | 340/572.4 |

FOREIGN PATENT DOCUMENTS

| | | |
|---|---|---|
| EP | 1 560 149 A2 | 8/2005 |
| WO | WO 01/20542 A2 | 3/2001 |
| WO | WO 03/036552 A1 | 5/2003 |
| WO | WO 03/098532 A1 | 11/2003 |

* cited by examiner

Primary Examiner — Albert Wong
Assistant Examiner — Pameshanand Mahase
(74) Attorney, Agent, or Firm — Oblon, Spivak, McClelland, Maier & Neustadt, L.L.P.

(57) ABSTRACT

The present invention relates to a reading/writing station (ST) comprising a casing (1) including in particular a memory (M) and an antenna (AN) for exchanging data wirelessly by inductive technology with electronic tags (ET, ETI), each having an antenna (5, 8), a memory (60, 70) and data processing means (61, 71) for interpreting requests sent by the station (ST), characterized in that:
  an electronic tag, called integrated electronic tag (ETI), suitable for storing data in its memory (70), is incorporated in the reading station (ST),
  the integrated electronic tag (ETI) is located in the reading station (ST), within range of the antenna (AN) of the reading station (ST).
The integrated electronic tag (ETI) makes it possible in particular to store data relating to the configuration of the reading station (ST) and/or application data.

11 Claims, 1 Drawing Sheet

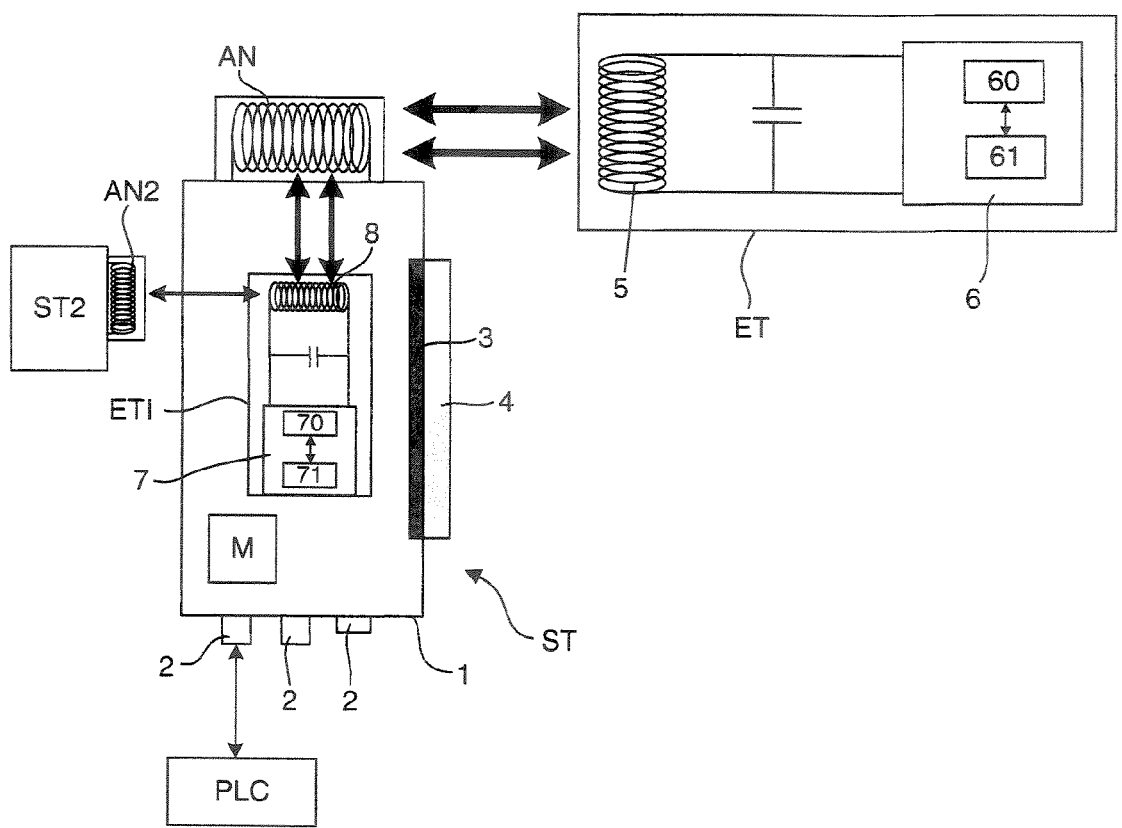

ELECTRONIC TAG READING/WRITING STATION

BACKGROUND OF THE INVENTION

1. Field of the Invention

The present invention relates to a reading/writing station comprising in particular a memory and an antenna for exchanging data wirelessly by inductive technology with electronic tags, each having an antenna, a memory and data processing means for interpreting requests sent by the station.

A Radio Frequency Identification System RFID is commonly used to identify objects, using a reading/writing station, each object bearing an electronic identification tag. Within range of the reading/writing station, the electronic tag exchanges a variety of information with the station, such as, for example, identification information or information linked to the current production process.

In an RFID-type identification system, each reading/writing station has an antenna generating a magnetic field used to power each electronic tag passing within its range and to dialogue with the latter using a predefined communication protocol. The tag is powered by the "carrier" emitted from the antenna of the station. The energy picked up by the antenna of the tag is converted into electrical energy and powers the internal circuits (memory, control circuit, etc.) of said tag for the latter to execute the programs for which it is designed. This electronic tag stores data, executes instructions originating from the station and transmits the requested data to the station. The exchange procedure comprises a number of phases, in particular: sending energy when the tag arrives within range of the reading/writing station, sending an identification instruction by the reading/writing station, sending a reading/writing instruction, writing or reading data.

The wireless RFID-mode data exchange is performed by an inductive technology based on the use of a mid-frequency electromagnetic signal (carrier) for the wireless transmission of information between the stations and the electronic tags. To transmit data to the reading/writing station, the tag modulates the carrier frequency in amplitude and/or in phase. The reading/writing station then converts the received signal into binary language.

2. Description of the Prior Art

A reading/writing station that fails or is destroyed following, for example, an electrical problem, must be immediately replaced by a new station so as not to disrupt the progress of the industrial process. The new station must be configured with the same parameters as the damaged station. Now, if the station that has been replaced is fundamentally damaged, its configuration parameters or its application data are often not easily recoverable. A complete programming of the new station is often necessary, which can take time and can disrupt the progress of the current industrial process.

Document EP 1 560 149 describes a portable telephone-type terminal incorporating an RFID reading/writing circuit and an RFID electronic tag. The antennas of the reading/writing circuit and of the electronic tag are arranged in proximity to each other on the same surface so as to reduce the footprint. A control circuit is used to switch from one antenna to the other to have the reading/writing circuit or the electronic tag communicate alternately with the external environment. In this device, if the station is damaged, the electronic tag is also damaged and the data stored on the tag therefore becomes non-recoverable.

SUMMARY OF THE INVENTION

The object of the invention is to propose a reading/writing station in which the configuration parameters and application data are easily recoverable, even if it has been fundamentally damaged.

This object is achieved by a reading/writing station comprising a casing including in particular a memory and an antenna for exchanging data wirelessly by inductive technology with electronic tags, each having an antenna, a memory and data processing means for interpreting requests sent by the station, characterized in that:

an electronic tag, called integrated electronic tag, suitable for storing data in its memory, is incorporated in the reading/writing station, the integrated electronic tag is located in the reading/writing station, within range of the antenna of the reading/writing station and is permanently magnetically coupled with the antenna (AN) of the reading/writing station (ST).

According to the invention, the antenna of the integrated electronic tag and the antenna of the station are separate and independent of each other so as to enable the data on the tag to be recovered if, for example, the antenna of the station is damaged.

According to a particular feature, the integrated electronic tag is located in the reading/writing station, so as to make its data accessible to any other reading/writing station within its range.

According to another particular feature, the reading/writing station comprises a slot into which the integrated electronic tag is inserted removably.

According to another particular feature, the integrated electronic tag is electrically insulated from the rest of the reading/writing station.

According to another particular feature, the memory of the reading/writing station is made up of the memory of the integrated electronic tag.

According to another particular feature, the integrated electronic tag is accessible in read and/or write mode.

According to another particular feature, the integrated electronic tag stores in its memory data relating to the configuration of the reading/writing station and/or application data, The reading/writing station described above can be incorporated in a sensor such as, for example, a pressure sensor or a photoelectric cell.

BRIEF DESCRIPTION OF THE DRAWINGS

Other characteristics and advantages will become apparent from the detailed description that follows, referring to an embodiment given by way of example and represented by the appended FIG. 1 showing a reading/writing station according to the invention.

DETAILED DESCRIPTION

The system illustrated in FIG. 1 comprises a reading/writing station ST comprising a casing 1 including in particular an antenna AN for exchanging, wirelessly according to the inductive or RFID technology, data with electronic tags ET that are presented to it.

The electronic tags ET are fixed onto objects and are presented as they come within range of the reading/writing station ST.

Each reading/writing station ST dialogues with the programmable logic PLC process automation system (data server on the network) normally within a network such as MODBUS, FIPIO, etc. Within the process automation network, each reading/writing station is identified by an individualized address.

The antenna AN of the station ST generates a magnetic field used to power each electronic tag ET passing within its range and enables the station ST to dialogue with the latter. The reading/writing station ST has connectors 2 joined to the casing 1 for connecting the power supply, connection to the network and connection to a console or to an information processing station such as a PC. The casing 1 of the reading/writing station ST also contains a memory M and electronic circuits for interfacing with the input/output connectors 2 and with the antenna AN.

The wireless data exchange is conducted by RFID which is an inductive technology based on the use of a mid-frequency electromagnetic signal (carrier) for the wireless transmission of information between the station and electronic tags.

An electronic tag ET comprises an antenna 5 consisting of an oscillating circuit LC and electronic circuits 6 comprising in particular a memory 60 and data processing means 61 for interpreting the requests sent by the reading/writing station ST and for sending the requested information. The electronic tag ET is powered by the "carrier" transmitted from the antenna AN of a reading station ST when it arrives within the range limits of said reading/writing station ST. The energy picked up by the antenna 5 of the tag ET is converted into electrical energy and powers the internal electronic circuits 6 of the tag ET. The electronic tag ET stores data, executes the instructions originating from the reading/writing station ST and transmits the requested data to the reading/writing station ST.

The memory 60 contained in the electronic tag ET is, as an indication, a RAM, EEPROM or FERAM technology memory, and stores, for example in encrypted form, a unique identifier, communication parameters and information relating to the object to which it is attached.

The exchange procedure between the reading/writing station ST and the electronic tag ET comprises a number of phases, in particular:
- sending of energy when an electronic tag ET arrives within range of a reading/writing station ST,
- sending by the reading/writing station ST of an identification instruction and response from the electronic tag ET with sending of a unique identifier,
- request from the reading/writing station ST to recover the communication parameters to be set up between the reading/writing station ST and the electronic tag ET,
- recovery of the data present in the memory 60 of the electronic tag ET.

According to the invention, the reading/writing station ST itself incorporates an electronic tag, called integrated electronic tag ETI, similar to the electronic tag ET described above. The integrated electronic tag ETI therefore comprises an antenna 8 consisting of an oscillating circuit LC, electronic circuits 7 comprising, in particular, data processing means 71 and a memory 70 for storing data such as configuration data of the reading/writing station ST in which it is incorporated and/or application data. This integrated electronic tag ETI is responsible for storing application data and/or configuration parameters of the reading/writing station ST with which it is associated. The application data stored in the tag ETI is data used by the station ST for the application to which it is dedicated. The application data can be, for example, identifiers of electronic tags ET determined when the station ST is, for example, used to perform access checks. The integrated electronic tag ETI is located in the station ST within range of the antenna AN of the station ST and is therefore magnetically coupled permanently with the antenna AN of the station ST. The antenna of the integrated electronic tag ETI is separate from the antenna AN of the station ST and is independent of the latter so as not to be damaged if the antenna AN of the station is damaged. Thus, the reading station ST can permanently dialogue with this tag ETI to read and/or write data in its memory 70.

Each time the reading/writing station ST is powered up, the integrated electronic tag ETI detected by the station sends its unique identifier to the reading/writing station ST. After the power-up and when the reading/writing station ST is operating normally, the integrated electronic tag ETI is permanently powered by the magnetic field generated by the antenna AN of the station ST. In order to avoid having the tag ETI declare itself continually to the reading/writing station ST when the reading station ST has already taken note of its identifier, the reading station ST can transmit to the integrated electronic tag ETI, a signal asking it to stop declaring itself.

Updates to the configuration data of the reading/writing station ST cause a program to be loaded for writing this new data into the integrated electronic tag ETI. The reading/writing station ST, already knowing the identifier of its integrated electronic tag ETI, then activates the integrated electronic tag ETI. The reading/writing station ST sets up a dialogue with the integrated electronic tag ETI for exchanging data wirelessly according to a predefined communication protocol, as with an electronic tag ET external to the station ST. The configuration and/or application data is written and stored in the memory 70 of the integrated electronic tag ETI.

Furthermore, the integrated electronic tag ETI is located in the station ST so as to be within range of any external station ST2 that could be approached. The configuration and/or application data stored in the integrated electronic tag ETI can thus be read by this other station ST2 without the integrated electronic tag ETI being removed from the reading/writing station ST. In the event of a problem with the reading/writing station ST, or if it is damaged, its configuration and/or application data can thus be recovered easily by another station ST2 by presenting the antenna AN2 of the new station ST2 within range of the integrated electronic tag ETI of the damaged station ST. The new station ST2 thus recovers the configuration and/or application data that it can write into its internal memory and to its own integrated electronic tag if it has one. The configuration and/or application data is therefore stored securely and can always easily be recovered.

According to the invention, as a variant or in addition, the reading/writing station ST can also comprise a slot 3 closed by a flap 4 into which the integrated electronic tag is inserted removably. If the station ST is damaged, the integrated electronic tag ETI can therefore easily be removed to be either directly inserted into a new station (ST2 for example), or be brought within range of the new station so as to transfer the data from the old station ST to the new station. Thus, as previously, no configuring of the new station ST2 is needed.

According to the invention, the integrated electronic tag ETI is electrically insulated from the rest of the station ST so as not to be damaged in the event of an electrical problem in the reading/writing station ST.

According to the invention, the integrated electronic tag ETI can also be used as memory for the reading/writing station ST, In this case, the memory M of the reading/writing station ST can be eliminated. The data received by the reading/writing station ST, for example during an industrial process, can therefore be stored directly in the memory 70 of the integrated electronic tag ETI. This means that the reading/writing station ST need not be provided with a specific memory.

According to the invention, within a network comprising a number of stations ST, each station ST can be addressed and configured easily on the network by inserting therein an integrated electronic tag ETI preprogrammed with pre-stored configuration data and/or application data. The data can then be transferred into the memory M of the station ST or kept in the integrated electronic tag ETI if the latter is used directly as memory by the reading/writing station ST.

The reading/writing station according to the invention can, for example, be incorporated in a sensor, such as, for example, a pressure sensor. This makes it possible to be able to easily recover the configuration data or setting data relating to this sensor if it is damaged. A transfer of the data from the integrated electronic tag of the damaged sensor to a new sensor also provided with a reading/writing station is thus carried out immediately and quickly.

It is, of course, possible, without departing from the framework of the invention, to imagine other variants and refinements of detail, and even envisage the use of equivalent means.

The invention claimed is:

1. A reading/writing station comprising:
a casing that includes
    a reading/writing station memory,
    a reading/writing station antenna to exchange data wirelessly by inductive technology with electronic tags, the electronic tags each having an electronic tag antenna, an electronic tag memory and a data processor configured to interpret requests sent by the reading/writing station, and
    an integrated electronic tag to store data in integrated electronic tag memory, the integrated electronic tag being incorporated in the reading/writing station permanently within range of the reading/writing station antenna and being permanently magnetically coupled with the reading/writing station antenna,
wherein
    the integrated electronic tag is powered via the reading/writing station antenna,
    the reading/writing station memory is made up of the integrated electronic tag memory, and
    the integrated electronic tag memory stores configuration data corresponding to the reading/writing station that the integrated electronic tag is permanently magnetically coupled with.

2. The reading/writing station according to claim 1, wherein the integrated electronic tag is located such that the integrated electronic tag memory is accessible to any other reading/writing station within range.

3. The reading/writing station according to claim 1, further comprising:
    a slot into which the integrated electronic tag is removably inserted.

4. The reading/writing station according to claim 1, wherein the integrated electronic tag is electrically insulated from the rest of the reading/writing station.

5. The reading/writing station according to claim 1, wherein the integrated electronic tag is accessible in any one of read and write mode.

6. The reading/writing station according to claim 1, wherein the integrated electronic tag memory stores application data.

7. The reading/writing station according to claim 1, wherein the reading/writing station is incorporated into a sensor.

8. The reading/writing station according to claim 1, wherein the integrated electronic tag further includes an antenna separate and independent from the reading/writing station antenna.

9. The reading/writing station according to claim 1, wherein the integrated electronic tag sends a unique identifier to the reading/writing station when the reading/writing station is turned on.

10. The reading/writing station according to claim 9, wherein the reading/writing station sends a signal to the integrated electronic tag to stop the integrated electronic tag from continually sending the unique identifier.

11. The reading/writing station according to claim 10, wherein, when performing access checks, the reading/writing station accesses the application data to identify electronic tags.

* * * * *